United States Patent

Millgard et al.

[11] 3,748,047
[45] July 24, 1973

[54] METHOD OF DETECTING SURFACE DEFECTS OF MATERIAL SURFACES

[75] Inventors: Lars Olof Anders Millgard, Nynashamn; Ulf Peter Trygveson Sjolin, Stockholm, both of Sweden

[73] Assignee: Rederiaktiebolaget Nordstjernan, Stockholm, Sweden

[22] Filed: Oct. 19, 1971

[21] Appl. No.: 190,523

[30] Foreign Application Priority Data
Oct. 21, 1970  Sweden.............................. 14177/70

[52] U.S. Cl............................ 356/200, 250/219 DF
[51] Int. Cl....................... G01n 21/16, G01n 21/32
[58] Field of Search.............. 250/219 DF, 219 WE, 250/223, 224; 356/200

[56] References Cited
UNITED STATES PATENTS

| 3,338,130 | 8/1967 | Gaffard | 250/219 DF |
| 3,657,727 | 4/1972 | Blevins | 250/219 WE |
| 3,633,037 | 1/1972 | Langenbeck | 250/219 WE |
| 3,614,232 | 10/1971 | Mathisen | 250/219 DF |
| 3,574,469 | 4/1971 | Emerson | 250/219 DF |

Primary Examiner—James W. Lawrence
Assistant Examiner—T. N. Grigsby
Attorney—Eugene J. Kalil et al.

[57] ABSTRACT

The apparatus and method of the invention are directed to photoelectrically observing differences in diffraction and reflection, for light scanning a surface to be inspected for defects, the comparison being between a pattern for the unknown surface and a pattern for a tolerably acceptable smooth surface. In application to inspection of a surface of continually moving sheet material, a flying-spot scanner is caused to scan generally transverse to sheet motion, and the photoelectric response is a measure of light scattered by transiently observed abnormalities in the moving surface.

10 Claims, 10 Drawing Figures

3,748,047

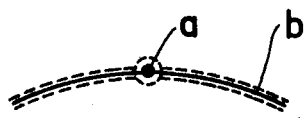
FIG. 3a    FIG. 3b
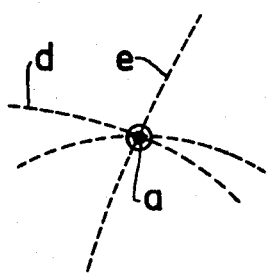
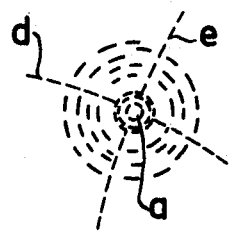
FIG. 4a    FIG. 4b
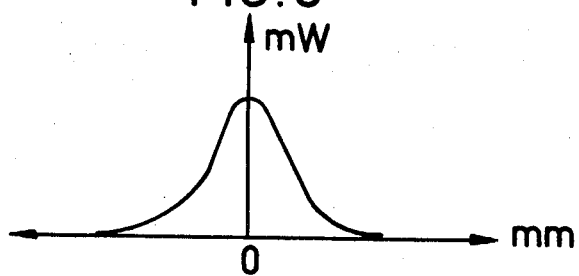
FIG. 5
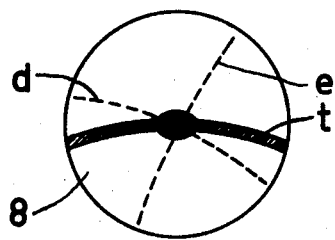
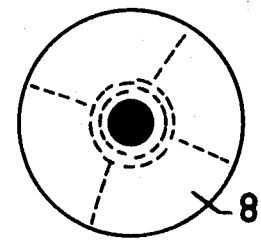
FIG. 6a    FIG. 6b
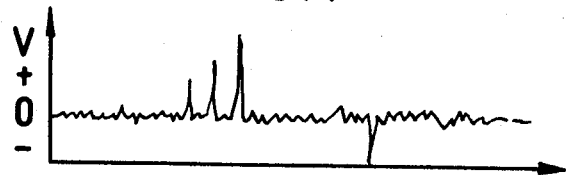
FIG. 7

METHOD OF DETECTING SURFACE DEFECTS OF MATERIAL SURFACES

The invention relates to a method of and an apparatus for detecting surface defects of preferably plane material, such as scratches or pores or corresponding elevations and discolorations at which a diffraction pattern being created in such a way that electromagnetic radiation from a radiation source is directed to ward the surface of the material to be examined. The produced diffraction-reflection or diffraction-transmission pattern is collected by a detecting device, to which signal processing means are connected.

A known device comprises an extended surface receiving the light at a constant distance from the reflecting or transmitting surface under inspection; the radiation device can operate according to the laser principle and a lens system can be used to receive the radiation. In the known system the detecting device comprises light wave directing means in the form of an internally reflecting surface, said means relying on an inlet slot to determine the incoming light (Swedish Pat. No. 324,913 issued Sept. 24, 1970).

The known system for detecting surface defects has however some disadvantages, among other things the difficulty in adjusting the suppression of signals deriving from the normal surface structure of the material.

The amplitude of the signals emitted from the detecting device at existing surface defects is not only due to the size of the defects but also to their direction in the material. If a wave-guide with internally reflecting material is used, the beam path is strongly dependent on the direction of a scratch in the material and the sensitivity of the detecting device varies in accordance with this. In addition a variation of the distance to the material path or angular change in this relative to the detecting device causes a variation of sensitivity in the detecting system. Finally the use of an extended surface receiving the light and in the form of a photoelectric semiconductor detector has the effect that the maximum velocity, at which a material surface can be scanned, is restricted by the time constant existing in semiconductor detectors.

The new method of and the apparatus for detecting surface defects according to the invention, avoids all these disadvantages and has furthermore several new advantages. The suppression of signals deriving from the normal surface structure can be adapted to the material surface of interest. Sensitivity variations due to the angular positions of scratches on the examined material surface become negligible, and the influence of variations in the position and angular setting of the material surface are reduced as well. A higher detectability is also obtained as the diffracted radiation is detected on both sides of the directly reflecting radiation (the so-called maximum point). There are obtained greater possibilities in adapting the sensitive detector surface or a corresponding equivalent transmitting surface to an existing diffraction-transmission pattern.

The angular positions of scratches on the material surface can be detected and scratches and dark spots in a material surface can be distinguished from each other. As according to the invention the reflected and diffracted radiation pattern is brought to a fixed position in space, one can also use detectors of a normal design, such as photomultipliers, which permits a greater detecting velocity and a lower price of the installation. Moreover the new device offers better possibilities of placing detectors for measuring the intensity in selected parts of the diffraction-reflecting image, for instance for brightness measurement, or additional discrimination of different types of surface defects. Finally the new detecting device is well fit for the construction of the system in modules, which makes it possible to adapt it to examination of material surfaces of different width.

The invention will be described more in detail in the following in connection with the drawings illustrating some embodiments of a device for the method.

FIG. 3a and 3b show examples of diffraction patterns obtained from various steel plates, in FIG. 3a from steel with characteristic mill finish and in FIG. 3b from steel without characteristic mill finish, in both cases from plate without surface defects.

FIG. 4a and 4b show diffraction patterns from the same plate material as in FIG. 3a and 3b, but with surface defects in the form of scratches.

FIG. 5 shows the distribution of the radiation intensity along a line of light in the diffraction pattern as a function of distances, for instance in millimeters.

FIG. 6a and 6b show two examples of optical spatial filters in the form of opaque masks used for the method of the invention, FIG. 6a in the form of a stripe and FIG. 6b in the form of a circular disc.

FIG. 7 shows an example of the detector signal as a function of time during scanning a surface with four defects, three scratches and a dark line.

The invention will be more closely described with reference to the figure. Detection of defects in material surfaces is described in connection with steel plate (with and withough characteristic mill finish, but the invention is by no means restricted to defect detection or metal surface but may for instance be used advantageously at detect detection on paper webs, ceramics, glass, reflector surfaces or surfaces of plastic material and the like.

Figure 1:
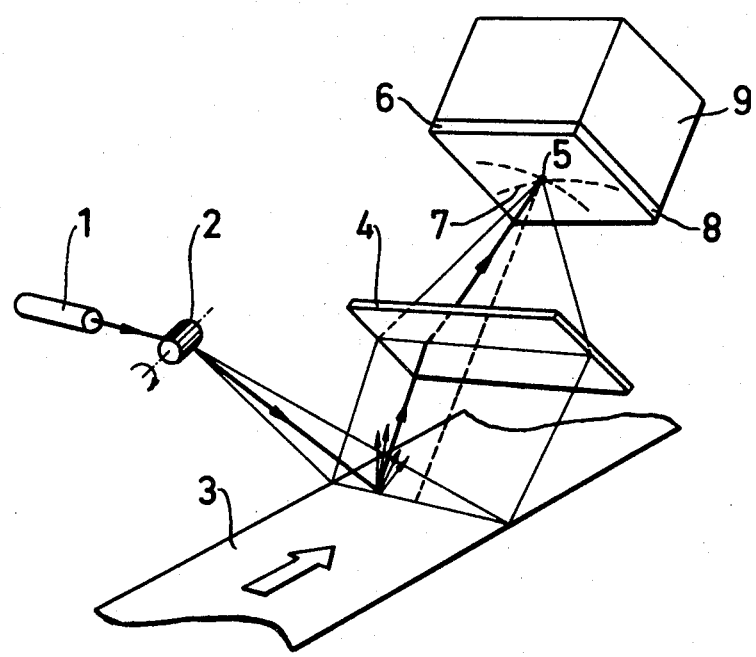
FIG. 1 shows schematically and in perspective an embodiment of a device for the method, where a lens system is arranged as an optical means after reflection and diffraction of the radiation against an examined material surface, which happens to be longitudinally moving sheet material, as suggested by longitudinal end breaks and by a large perspective arrow.

In the device of FIG. 1 a light beam is directed from a radiation source, for instance a laser 1, to a rotating prism 2 and is in this way caused to scan across a material surface 3, which may be the upper surface of sheet material supported and driven continuously in a generally horisontal plane, as suggested by the large perspective arrow surface 3. After reflection against the material surface 3 the light beam is refracted by means of an optical device 4, for instance a lens system, to a stationary point 5 in the space in the plane 6. The light scattering because of diffraction at the contact of the light beam with the material surface gives rise to a so-called diffraction pattern 7 in the image plane, of which some examples are shown in FIG. 3a, 3b and 4a, 4b. In the plane 6 an optical element is inserted according to the invention, for instance a so-called spatial filter, which is so constituted that the directly reflecting light and the light scattered on account of diffraction in the normal surface structure of the material surface are blocked, while light spread because of surface defects, for instance scratches or the like, pass on to a detector 9. The optical element 8 can be designed in several manners within the scope of the invention.

Figure 2:
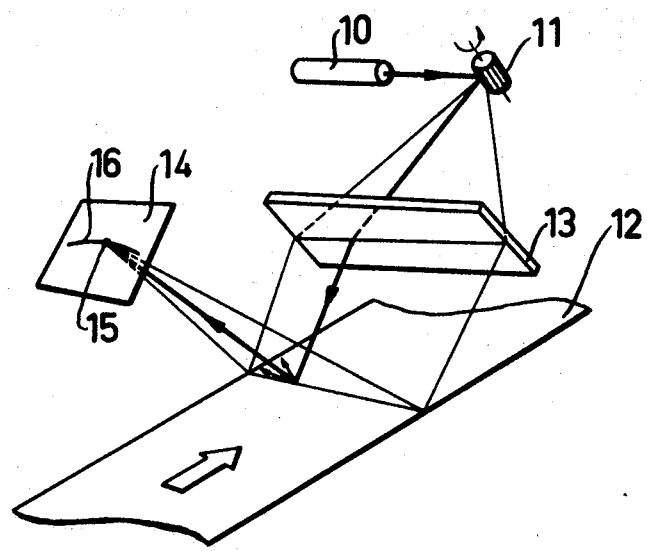
FIG. 2 is a similar view of another embodiment of a device for the method, where a lens system is adapted before the reflection of the radiation against an examined material surface.

In FIG. 2 an alternative embodiment of a device of the invention is shown, where a light beam from a laser 10 is directed to a rotating prism 11. In the beam path from the prism 11 and before the reflection of the radiation at the material surface an optical device 13, for instance a lens system, is so adapted that after the reflection and diffraction respectively of the radiation at a material surface 12 during scanning the surface a stationary image is obtained in the space in a suitable selected image plane 14. The image consists of a stationary central point 15 and a diffraction pattern, for instance in the form of a curved line 16.

The appearance of the diffraction pattern is different for different types of surfaces. FIG. 3a, 3b and 4a, 4b show examples of the diffraction pattern from steel with or without characteristic mill finish and surface defects respectively.

In both cases the pattern consists of a centre with a point a corresponding to the directly reflecting light, while the surrounding light has spread due to diffraction at the normal surface structure of the plate. A surface of steel has given rise to the pattern in FIG. 3a which indicates strong, parallel, longitudinal characteristic mill finish in the surface, which gives at diffraction a marked, somewhat curved light line B in the image plane. A steel surface according to FIG. 3b is however lacking such characteristic mill finish, and therefore its surface structure gives rise to a more diffuse, rotational symmetric scatter c of the light around the centre a.

In FIG. 4a and 4b the diffraction pattern of the same type of plate as in FIG. 3a and 3b is shown, but there the examined surfaces have two scratches oriented 30° and 120° respectively to the longitudinal direction of the plate. These give in the diffraction pattern the light lines d and e. As the angular relations of these light lines are the same as the angular relations between the scratches that have given rise to them on the plate to be inspected, direct information about the existence of scratches as well as their angular positions on the plate is obtained in both cases.

In FIG. 5 the fundamental distribution of the radiation intensity along a light line in the diffraction pattern is shown. Te intensity is apparently dependent on the distance from the centre O of the diffraction pattern, and therefore detecting should take place at a constant distance from the centre independently of the angular orientation of the light line. This is made possible by the device of the invention producing a stationary picture of the diffraction pattern of the surface in the space and in this way permitting the use of a rotation symmetrical detector.

In FIG. 6a and b examples of the optical element 8 illustrated in FIG. 1 are given. In FIG. 6a a spatial filter adapted to the material that has caused the diffraction pattern in FIG. 3a, is shown. (A spatial filter is a device for which optical transmission varies across its surface). Its transmission is in each point adapted to the intensity in the diffraction pattern falling towards the filter, said pattern being caused by the faultless material surface, so that only radiation (d and e) being spread beside the normal pattern due to surface defects, passes the filter in non-attenuated condition, whereas the normal pattern is attenuated totally or in part. In FIG. 6b the corresponding filter is shown as adapted to the material that has caused the diffraction pattern in FIG. 3b. In the most simple case the adapted spatial filter may consist of an opaque masking. A better adaption of the signal is obtained if the transmission of the filter in each point is inversely proportional to the intensity of the normal diffraction pattern. This can for instance be achieved if the spatial filter is produced by exposure of a photographic film with the normal diffraction pattern achieved during scanning.

Alternatively the mask may consist of an adapted, optical filter, for which transmission properties for diffraction radiation are automatically variable. For this purpose, for instace, a photochromous material is used, for which the transmission is reduced at a suitable velocity at increased radiation intensity and regains its original transparency when the radiation ceases. The stationary diffraction image deriving from the normal surface structure of the material surface darkens the photochromous material and is therefore not transmitted to the same extent as the diffraction image deriving from surface defects, which changes too rapidly to darken the photochromous material. Thus masking will automatically be adapted to the surface structure of the material to be examined. No special adjustment or special shape of the mask is necessary for different materials and material surfaces.

If the material is optically active, for instance paper, the mask may also consist of a polarisation filter, which filters the directly reflected or transmitted radiation but transmits the part of the radiation for which the polarisation direction has been changed by reason of scattering by surface defects.

Irrespective of the choice of masking, a certain amount of the reflected light is always transmitted to the detector. This is to make it possible to detect dark spots and the like on the material surface, which cause decrease in the reflected light intensity.

In FIG. 7 an example of a diagram of the output signal from a detector according to the invention is shown as voltage as a function of the time during a radiation scan over a plate having three scratches and one dark line. Te scratches become visible as positive deflections upwards from a zero line. As is apparent from this example the new device makes it possible, in addition to rapid and exact detection of surface defects, to distinguish between scratches and dark parts of a material surface. Dark parts give rise to a reduction of the reflected light intensity, but scratches cause light scattering, meaning an increase in the received light intensity. The output signal from the device for detection of radiation variations due to surface defects can be divided into two channels by means of polarity sensitive elements, where one channel merely processes positive output signals deriving from scratches and the like, whereas the other channel merely processes negative output signals deriving from dark spots and the like.

All according to the varying needs existing at industrial production, the method of the invention provides the possibility to continually detect, record and discern defects in material surfaces of different kinds and dimensions. The output signal of the detecting device can be evaluated electronically, for instance by means of a counter, and can be presented in a suitable manner. Thus the detecting device can, for instance, be connected to computers controlling the manufacturing or working processes of the controlled material. The control can also be adapted to start cutting and sorting of the material to different lengths depending on the amount and/or shape of the detected defects. The control can also be adapted so as to stop the manufacture or processing of the material, when a limit value of the surface defects permitted for the material is detected.

What is claimed is:

1. The method of detecting surface defects of preferably smooth material, which comprises:
  a. directing electromagnetic radiation from a radiation source to a surface of the material to be examined;
  b. relatively moving said surface and radiation in a first general direction;
  c. causing said radiation to periodically scan said surface along an alignment generally transverse to said relative movement;
  d. producing a stationary image of diffraction patterns from reflections of electromagnetic radiation reflected from said surface;
  e. filtering out image elements deriving from the normal structure of said surface; and
  f. detecting image elements which survive such filtering, whereby the detected output is a measure of defects in said surface.

2. The method of claim 1, wherein an opaque material is used in said filtering step.

3. The method of claim 1, in which said filtering step is accomplished by attenuating image elements deriving from the normal structure of said surface being examined.

4. Apparatus according to claim 3, wherein said photoelectric means comprises a plurality of detector elements, each sensitive to scratches with an orientation within a certain angular range.

5. Apparatus for continuous inspection of surface quality in a straight presumptively smooth surface of a given body, comprising an optical flying-spot scanner having a straight-line scan path in a scanning surface in which the scan spot is swept in periodic recycling succession, means for supporting the given body with its smooth surface in a plane intersected by said scanning surface at an angle of incidence such that intersection of said surfaces defines the alignment of the scan path, said last-defined means including means for relatively displacing said body and scanner in a direction generally transverse to the scan path, whereby the light spot is reflected from the surface along a correspondingly swept axis of reflection within a predominant surface of reflection, with dispersed light within a range of angles near said surface of reflection, focusing optical means positioned to collect the substantial range of light reflected in the course of scanning, and focusing optical means being adapted to converge collected directly reflected light at a single focal point, an optical attenuator in substantially the focal surface of said focusing optical means, said attenuator having an area-function of attenuation selected essentially only to attenuate a substantial fraction of the total light flux attributable to reflection from a surface tolerably free from defects, and photoelectric means responsive to light passing said attenuator.

6. Apparatus according to claim 5, wherein said optical attenutator includes a photographic film exposed with said diffraction patterns from a surface free from defects.

7. Apparatus according to claim 5, in which said flying-spot scanner comprises a laser generating a beam of coherent light, and means including a continuously rotating prism mirror for sweeping said beam in said scanning surface.

8. Apparatus according to claim 5, wherein said optical attenuator includes an adaptive optical filter with transmission properties automatically adapted to the surface to be examined.

9. Apparatus according to claim 8, wherein the adaptive optical filter consists of a photochromous material.

10. Apparatus for continuous inspection of surface defects in a moving sheet, comprising means for supporting and conveying sheet material to be inspected, an optical flying-spot scanner supported above the sheet-supporting and conveying means, said scanner translating a light spot in a scanning surface intersecting said sheet in a line across a given width of the sheet in periodic recycling succession, whereby the light spot is reflected from the sheet along a correspondingly swept axis of reflection within a predominant surface of reflection, with diffracted and diffused light within a range of angles near said axis, focusing optical means positioned to collect the substantial range of light reflected and diffracted in the course of scanning, said focusing optical means being adapted to converge collected directly reflected light at a single focal point, an optical attenuator in substantially the focal surface of said optical means, said attenuator having an area-function of attenuation selected essentially only to attenuate a substantial fraction of the toral light flux attributable to reflection from a surface tolerably free from defects, and photoelectric means responsive to light passing said attenuator.

* * * * *

UNITED STATES PATENT OFFICE
CERTIFICATE OF CORRECTION

Patent No. 3,748,047                    Dated July 24, 1973

Inventor(s)    Lars Olof Anders Millgard et al.

It is certified that error appears in the above-identified patent and that said Letters Patent are hereby corrected as shown below:

Column 6, line 3, "and focusing" should read -- said focusing --; line 48, "toral" should read -- total --.

Signed and sealed this 12th day of February 1974.

(SEAL)
Attest:

EDWARD M. FLETCHER, JR.           C. MARSHALL DANN
Attesting Officer                 Commissioner of Patents